United States Patent
Kawamura et al.

[11] Patent Number: 5,428,539
[45] Date of Patent: Jun. 27, 1995

[54] TRACTION CONTROL SYSTEM FOR AN AUTOMOTIVE VEHICLE UTILIZING A WHEEL SLIP DURATION TIMER

[75] Inventors: Makoto Kawamura; Toshiaki Tsuyama; Kazutoshi Nobumoto; Haruki Okazaki, all of Hiroshima, Japan

[73] Assignee: Mazda Motor Corporation, Hiroshima, Japan

[21] Appl. No.: 868,424

[22] Filed: Apr. 15, 1992

[30] Foreign Application Priority Data

Apr. 15, 1991 [JP] Japan .................................. 3-082342

[51] Int. Cl.⁶ .............................................. B60T 8/58
[52] U.S. Cl. ................................. 364/426.02; 180/197
[58] Field of Search ................... 364/426.01, 426.02, 364/426.03, 426.04; 180/197

[56] References Cited

U.S. PATENT DOCUMENTS

| | | | |
|---|---|---|---|
| 4,998,782 | 3/1991 | Thatcher et al. | 364/426.03 |
| 5,000,281 | 3/1991 | Nobomoto et al. | 180/197 |
| 5,004,064 | 4/1991 | Tezuka et al. | 364/426.02 |
| 5,168,950 | 12/1992 | Krosche | 180/197 |
| 5,198,982 | 3/1993 | Kobayashi | 364/426.02 |
| 5,210,690 | 5/1993 | Kageyama et al. | 364/426.02 |
| 5,210,692 | 5/1993 | Fennel et al. | 364/426.02 |
| 5,220,506 | 6/1993 | Kuwana et al. | 364/426.02 |
| 5,255,193 | 10/1993 | Katayose et al. | 364/426.02 |

Primary Examiner—Kevin J. Teska
Assistant Examiner—Stephen J. Walder, Jr.
Attorney, Agent, or Firm—Fish & Richardson

[57] ABSTRACT

When a wheel slip value of the driven wheel relative to a surface of road becomes excessive during acceleration, torque to be applied to the driven wheels is controlled by the traction control so as to make the actual wheel slip value of the driven wheel become a predetermined target value. There is counted the duration of time during which the actual wheel slip value of the driven wheel becomes smaller than a predetermined threshold value set as a value smaller than the target value, and a control value for the traction control is corrected in accordance with the duration of time counted. This correction is implemented so as to increase the torque to be applied to the driven wheels larger as the duration of time counted becomes longer. The control value to be corrected includes the target value itself or a road surface friction coefficient $\mu$ as a parameter for setting the target value.

28 Claims, 7 Drawing Sheets

TRACTION CONTROL SYSTEM FOR AN AUTOMOTIVE VEHICLE UTILIZING A WHEEL SLIP DURATION TIMER

BACKGROUND OF THE INVENTION

1. Field of the Invention

The present invention relates to a traction control system for an automotive vehicle and, more particularly, to a traction control system for controlling torque to driven wheels so as not for wheel slip to exceed a predetermined value.

2. Description of the Related Art

If the driven wheel of a vehicle slips at a relatively large amount relative to a surface of road, for instance, when an accelerator pedal is depressed to accelerate the vehicle, the driven wheel cannot offer appropriate grip so that suitable running characteristics cannot be gained. In order to suppress the wheel slip from exceeding a predetermined degree, the automotive vehicle is provided with a traction control system that can supply braking force to the driven wheels or that can decrease engine power.

Such a traction control system usually performs the traction control by setting a target slip value in accordance with a friction coefficient $\mu$ on a surface of road. Such a traction control system is adapted to perform operations to decrease torque to the driven wheels by supplying the braking force to the driven wheels or by decreasing the engine power, when the slip value of the driven wheel exceeds a predetermined value. In this case, the road surface friction coefficient $\mu$ to be employed for setting the target slip value may be estimated on the basis of a peripheral speed of a non-driven wheel or on the basis of the peripheral speed of the non-driven wheel and peripheral acceleration of the non-driven wheel, as described in Japanese Patent Laid-open Publication (kokai) No. 60-99,757.

Another example of a traction control system is proposed, for example, by Japanese Patent Laid-open Publication (kokai) No. 63-166,649, which is so adapted as to implement the traction control by operating a braking system for braking driven wheels, together with decreasing the engine power, only when the slip of the driven wheel is of a relatively large scale. This traction control system, however, performs the traction control by decreasing the engine power without using the braking system for the driven wheels, when the wheel slip of the driven wheel is of a relatively small scale, with durability of the braking system taken into account. This traction control system is arranged to adjust an amount of intake air to be supplied to a combustion chamber of an internal combustion engine through its intake passage when the operations for decreasing the torque for driving the wheels are carried out by decreasing the engine power when the slip of the driven wheel becomes larger than a predetermined value. The amount of intake air is adjusted by adjusting an opening angle of an auxiliary throttle valve disposed in the intake passage of the internal combustion engine separately from a main throttle valve disposed so as to open an opening angle thereof in association with an accelerator pedal. The auxiliary throttle valve is driven by an actuator disposed so as to be controlled by a control signal for changing the wheel slip of the driven wheel to a target slip value when the wheel slip thereof became larger than the predetermined slip value.

When the slip of the driven wheel is suppressed, for instance, due to the state of the surface of road and the slip value thereof becomes a relatively smaller slip value, thereby allowing a peripheral velocity of the driven wheel to approximate to a peripheral velocity of the non-driven wheel, the slip of the driven wheel relative to the surface of road may not be converted into the predetermined target slip value at which an increase in the driving force can be transmitted to the surface of road with high efficiency even if the accelerator pedal have been depressed. In this case, the problem may arise that feeling of good acceleration cannot be attained when the accelerator pedal is depressed with the attempt to gain good acceleration.

SUMMARY OF THE INVENTION

Therefore, the present invention has the object to provide a traction control system for an automotive vehicle, so adapted as to promptly return the state of the running vehicle to the state in which the slip of the driven wheel becomes a predetermined target slip value at which an increase in the driving force of the internal combustion engine can be transmitted in a highly efficient manner to a surface of road, during traction control, when the slip of the driven wheel is suppressed due to changes in the surface of the road.

Figure 12:
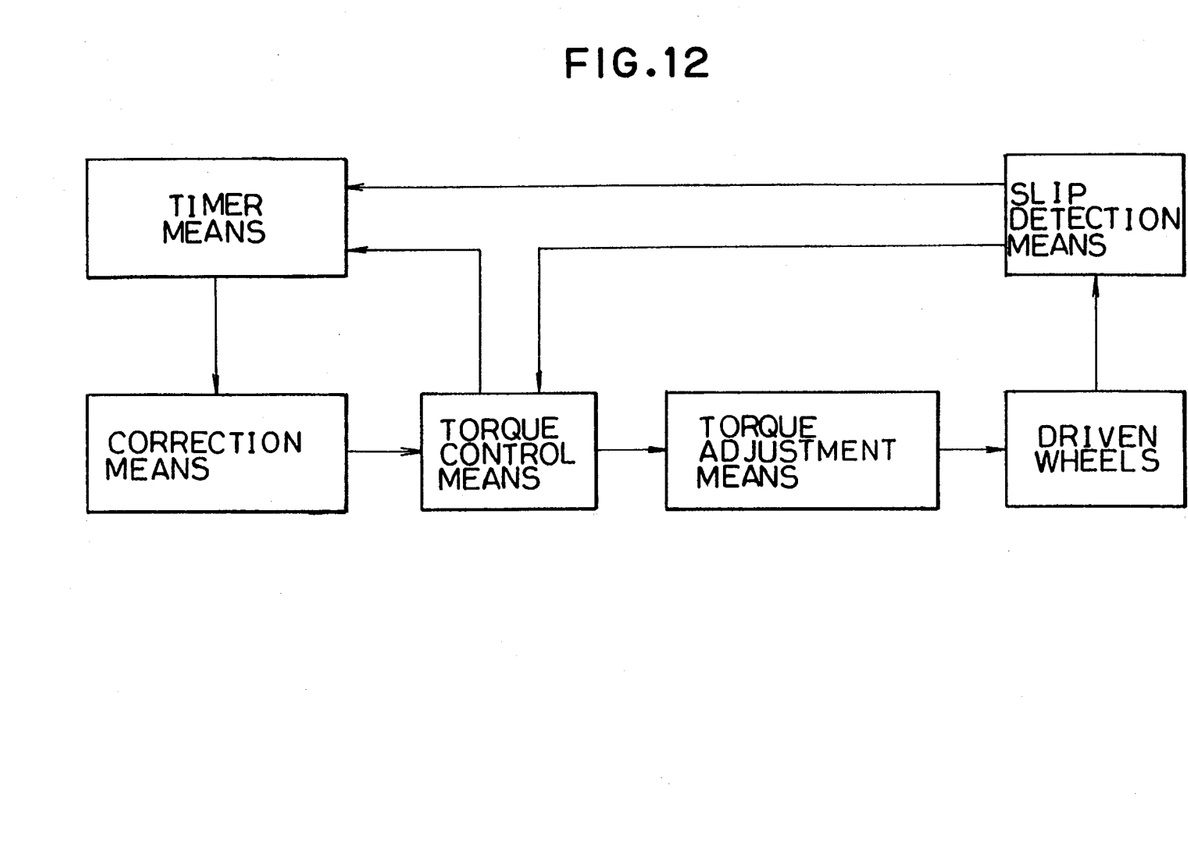
FIG. 12 is a block diagram showing the brief configuration of the traction control system according to the present invention.

In order to achieve the aforesaid object, the present invention has the configuration as briefly shown in FIG. 12. More specifically, the present invention has the object to provide a traction control system for an automotive vehicle, comprising:

torque adjustment means for adjusting torque to be applied to a driven wheel;

slip detection means for detecting a wheel slip value of the driven wheel relative to a surface of road;

torque control means for controlling said torque adjustment means so as to make a wheel slip value detected by said slip detection means become a predetermined target value;

timer means for counting a time during control by said torque control means, said time being required to become smaller than a predetermined threshold value set as a value smaller than said predetermined target value; and correction means for correcting a control value to be employed for control by said slip control means so as to increase the torque to be supplied to the driven wheel and for setting an amount of correction so as to become larger as the time counted by said timer means becomes longer.

The traction control system having the aforesaid configuration according to the present invention is adapted to change the contents of the traction control so as to increase the torque to be supplied to the driven wheel when an actual slip value of the driven wheel becomes smaller than the predetermined threshold value, that is, when the slip of the driven wheel is suppressed. This control mode can assist the vehicle escape rapidly the situation in which the torque of the internal combustion engine to be supplied to the driven wheel is decreased to an unnecessarily large extent, thereby capable of satisfying requirements for acceleration. Further, since the amount of correction required for increasing the torque to be supplied to the driven wheel is set in accordance with the time in which the slip value detected is smaller than the predetermined threshold value, the situation can be prevented from occurring, in which the torque to be supplied to the driven wheel is caused to increase to an unnecessarily large extent by correcting the control value for the traction control, that is, in which a large degree of wheel slip would occur again due to the correction itself.

The control value serving as an object of correction by the correction means may be chosen in an appropriate way as long as a control value functions as an element for increasing the torque to be applied to the driven wheel. For instance, such a control value may include the predetermined target value itself or a road surface friction coefficient $\mu$.

Further, the threshold value may be set as a certain constant value. It is also possible to set the threshold value as a predetermined rate of the target value, in instances where the target value may be set on the basis of a vehicle speed as a parameter. In other words, in this case, the threshold value is varied with the target value.

Other objects, features and advantages of the present invention will become apparent in the course of the description of the preferred embodiments, which follows, with reference to the accompanying drawings.

DESCRIPTION OF THE PREFERRED EMBODIMENTS

First Embodiment

Figure 1:
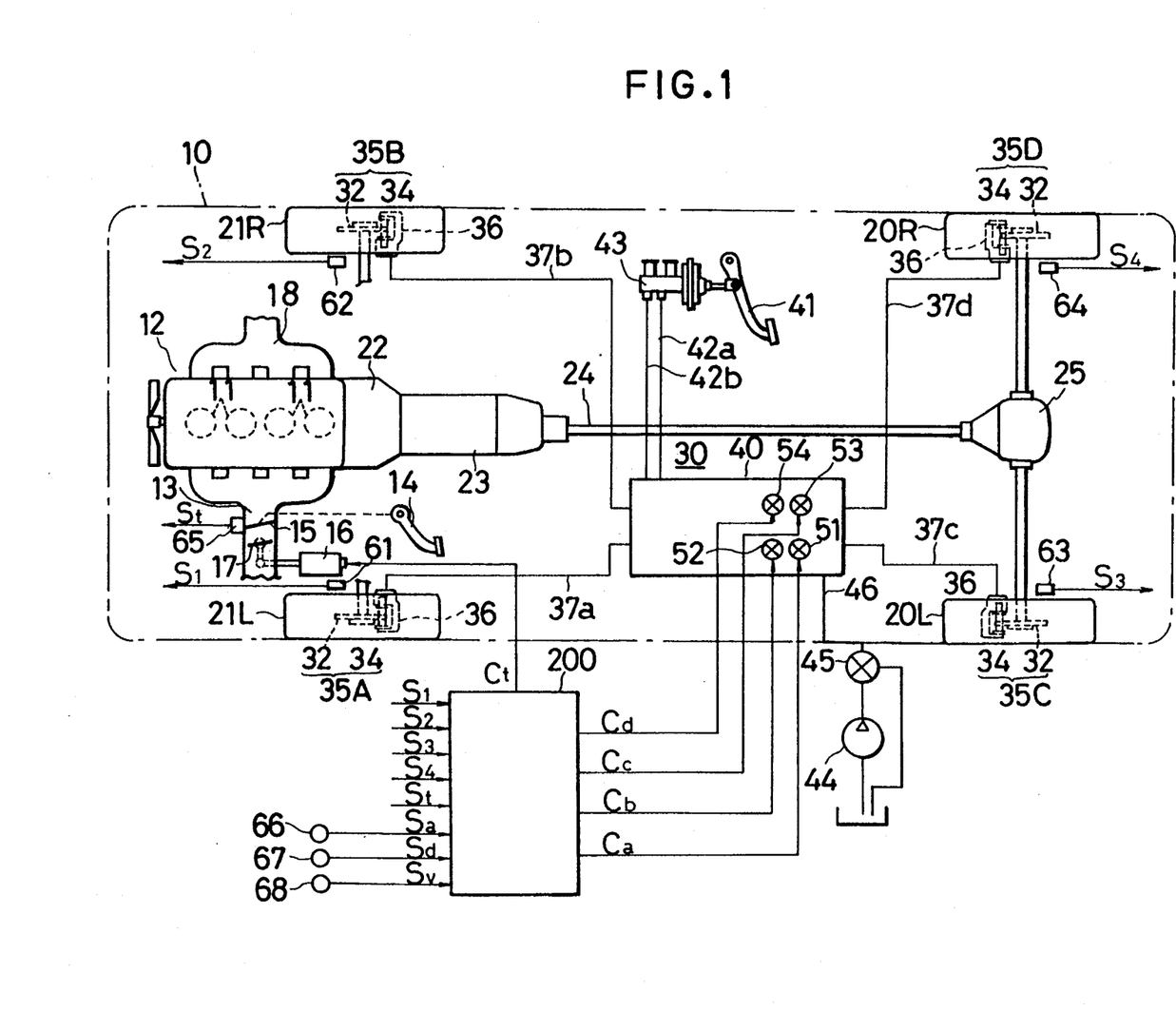
FIG. 1 is a schematic representation showing an outline of the traction control system according to the present invention.

As shown in FIG. 1 showing an example of the traction control system according to the present invention, an internal combustion engine 12 is loaded at a front portion of a body 10 of a vehicle. The internal combustion engine 12 may have four cylinders 11 each of which is communicated with an intake passage 13 and an exhaust passage 18. Fuel supplied from a fuel supply system is mixed with air supplied through the intake passage 13, and the resulting mixture of fuel is supplied to each of the cylinders 11 and burned in the cylinder 11 by operating an ignition system, and exhaust gases are withdrawn from the exhaust passage 18.

The intake passage 13 is provided with a main throttle valve 15 so disposed as to change its opening angle in association with an accelerator pedal 14 and with an auxiliary throttle valve 17 so disposed as to be opened or closed by a throttle actuator 16. The amount of the intake airflow through the intake passage 13 is adjusted by the main throttle valve 15 and the auxiliary throttle valve 17. The intake air is then mixed with fuel supplied from the fuel supply system, and the resulting mixture of fuel is burned in the cylinders 11 to bring the internal combustion engine 12 into an operative state, thereby transmitting engine power (torque) to a left-hand rear wheel 20L and a right-hand rear wheel 20R, each serving as driven wheels, through a power transmission passageway consisting of a fluid-type torque converter 22, an automatic transmission 23, a propeller shaft 24 and a differential mechanism 25.

The internal combustion engine 12, the fluid-type torque converter 22 and the automatic transmission 23 are interconnected together so as to form one block, and a left-hand front wheel 21L and a right-hand front wheel 21R are interconnected with each other so as to interpose the block, and the front wheels serve as non-driven wheels. A brake control section 30 is disposed in association with the left-hand and right-hand front wheels 21L and 21R as well as the left-hand and right-hand rear wheels 20L and 20R, respectively, and the brake control section 30 consists of disk brakes 35A, 35B, 35C and 35D which are fitted with the wheels 21L, 21R, 20L and 20R, respectively, each of the disk brakes 35A, 35B, 35C and 35D consisting of a disk 32 and a caliper 34 fitted with a brake pad for applying braking force to the disk 32. The caliper 34 has a wheel cylinder 36 to which corresponding ducts 37a, 37b, 37c and 37d extending from a liquid pressure adjustment section 40 are connected. When braking liquid pressure is supplied to the wheel cylinder 36 through the corresponding conduits 37a, 37b, 37c and 37d, each caliper 34 produces braking force for pressing the brake pad to the disk 32 in accordance with the produced braking force to thereby brake the respective wheels 21L, 21R, 20L and 20R.

To the liquid pressure adjustment section 40 is fed liquid pressure from a power cylinder 43 associated with a braking pedal 41 through conduits 42a and 42b in accordance with the operation for depressing the braking pedal 41. Further, operating liquid pressure produced by a pump 44 and a pressure governing valve 45 is supplied to the liquid pressure adjustment section 40 through a conduit 46. The liquid pressure adjustment section 40 is so arranged as to take up an operating position in which braking liquid pressure is produced in accordance with the operations of depressing the braking pedal 41 and the braking liquid pressure is supplied to the disk brakes 35A, 35B, 35C and 35D through the respective conduits 37a, 37b, 37c and 37d and, further, as to take up an operating position in which braking liquid pressure is produced individually for the disk brakes 35C and 35D, thereby selectively feeding the braking liquid pressure to the disk brakes 35C and 35D in accordance with the operating states of built-in electromagnetic opening-closing valves 51, 52, 53 and 54, respectively.

A group of the electromagnetic opening-closing valves 51 and 52 is provided for adjusting the braking liquid pressure to the disk brake 35C mounted to the left-hand rear wheel 20L, and another group of the electromagnetic opening-closing valves 53 and 54 is provided for adjusting the braking liquid pressure to the disk brake 35D mounted to the right-hand rear wheel 20R. When the electromagnetic opening-closing valve 51 is closed and the electromagnetic opening-closing valve 52 is opened, the braking liquid pressure to be supplied to the disk brake 35C is decreased. Likewise, when the electromagnetic opening-closing valve 53 is closed and the electromagnetic opening-closing valve 54 is opened, the braking liquid pressure to be supplied to the disk brake 35D is decreased. On the other hand, when the electromagnetic opening-closing valve 51 is opened and the electromagnetic opening-closing valve 52 is closed, the braking liquid pressure to be supplied to the disk brake 35C is increased. Likewise, when the electromagnetic opening-closing valve 53 is opened and the electromagnetic opening-closing valve 54 is closed, the braking liquid pressure to be supplied to the disk brake 35D is increased. In addition, when both of the electromagnetic opening-closing valves 51 and 52 are closed, the braking liquid pressure to be supplied to the disk brake 35C is retained at the previous level. Likewise, when both of the electromagnetic opening-closing valves 53 and 54 are closed, the braking liquid pressure to be supplied to the disk brake 35D is retained at the previous level.

A control unit 200 is provided for operating the throttle actuator 16 and for opening or closing the electromagnetic opening-closing valves 51 to 54. The control unit 200 consists of a microcomputer composed of CPU, ROM, RAM, CLOCK and I/O interface and it is supplied with signals from various sensors. The sensors include speed sensors 61, 62, 63 and 64, a throttle valve's opening angle sensor 65, an accelerator pedal sensor 66, a steered angle sensor 67, and a vehicle speed sensor 68. The speed sensors 61, 62, 63 and 64 are mounted so as to be associated with the left-hand and right-hand front wheels 21L and 21R as well as with the left-hand and right-hand rear wheels 20L and 20R and adapted to sense peripheral velocities of the wheels 21L, 21R, 20L and 2OR, generating signals S1, S2, S3 and S4, indicative of the peripheral velocities thereof, respectively, to the control unit 200. The throttle valve's opening angle sensor 65 is disposed in association with the main throttle valve 15 and adapted to sense an opening angle of the main throttle valve 15 and generate an output signal St indicative of the opening angle thereof. The accelerator pedal sensor 66 is adapted to sense a position of the accelerator pedal 14 and generate an output signal Sa indicative of the accelerator position thereto. Further, the steered angle sensor 67 is adapted to sense steered angles of the left-hand and right-hand front wheels 21L and 21R and generate an output signal Sd indicative of the steered angles thereof to the control unit 200. In addition, the vehicle speed sensor 68 is adapted to sense a vehicle speed of the vehicle and generate an output signal Sv indicative of the vehicle speed thereto.

Traction Control

The output signals S1, S2, S3, S4, St, Sa, Sd and Sv are entered into the control unit 200 at predetermined intervals, and the control unit 200 determines an average peripheral velocity of the non-driven wheels, VWN, by averaging out the peripheral velocity of the left-hand front wheel 21L indicated by the output signal S1 and the peripheral velocity of the right-hand front wheel 21R indicated by the output signal S2 as well as peripheral acceleration of the non-driven wheel, AWN, by differentiating the average peripheral velocity VWN. Then, the resulting average peripheral velocity VWN and peripheral acceleration AWN of the non-driven wheels are collated with a data map, stored in a built-in memory, defining in advance the relationship among the average peripheral velocities of non-driven wheels, peripheral acceleration of non-driven wheels and road surface friction coefficients $\mu$, thereby estimating a basic road surface friction coefficient $\mu B$ for the left-hand rear wheel 20L and the right-hand rear wheel 20R, as will be shown in Table 1 below.

In addition to the average peripheral velocity of the non-driven wheels, a peripheral velocity of the driven wheel having a higher peripheral velocity is selected as a reference peripheral velocity of the driven wheels, VWD, when the peripheral velocity of the left-hand rear wheel 20L is different from that of the right-hand rear wheel 20R. Then, the difference between the reference peripheral velocity VWD and the average peripheral velocity VWN of the non-driven wheels is given to thereby determine a slip value of a driven wheel, which serves as a reference for controlling the engine power. When the slip value of the driven wheel as the reference slip value is set to be smaller than a predetermined threshold value, e.g. 0.5 km per hour, the duration of time, Tt, during which the slip value continues to be smaller than the predetermined threshold value, is counted and collated with a data map, stored in advance in a built-in memory, defining the relationship between the time during which the slip value is lower than the predetermined threshold value and a correction value for correcting road surface friction coefficients $\mu$, thereby determining a correction value of road surface friction coefficient $\mu A$, as will be shown in Table 2 below. A corrected or final road surface friction coefficient $\mu F$ is set by adding the correction value $\mu A$ to the basic road surface friction coefficient $\mu B$.

Figure 5:
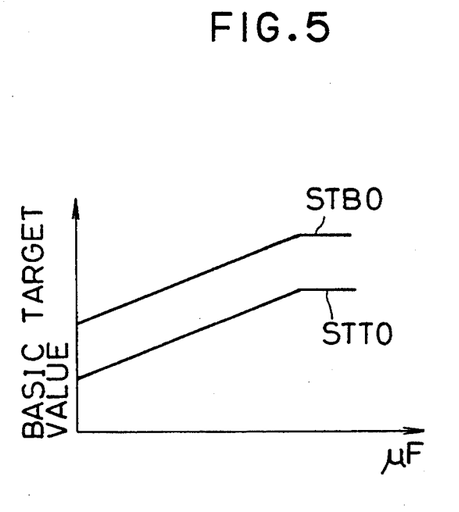
FIG. 5 is a graph showing an example of setting basic target values relative to road surface friction coefficient $\mu$.
Figure 6:
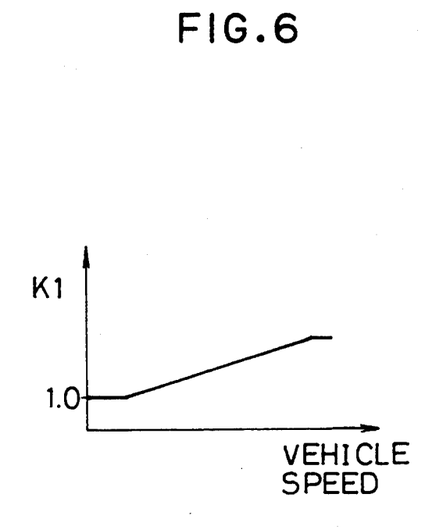
FIG. 6 is a graph showing the relationship of a correction coefficient of the target value with a vehicle speed.
Figure 7:
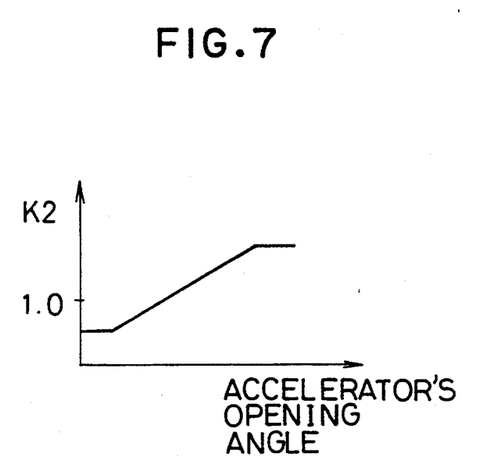
FIG. 7 is a graph showing the relationship between an opening angle of an accelerator and a correction coefficient of the target value.
Figure 8:
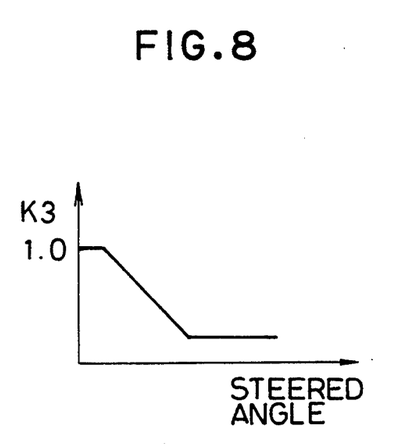
FIG. 8 is a graph showing the relationship between a steered angle of a steering wheel and a correction coefficient of the target value.

Further, a first basic target slip value STT0 and a basic second target slip value STB0 are given by collating the resulting basic road surface friction coefficient $\mu B$ with a data map, stored in advance in a built-in memory, defining the relationship between the road surface friction coefficients $\mu$ and target slip values, as illustrated in FIG. 5. The first basic target slip value STT0 is adapted to control the engine power for the traction control by adjusting the opening angle of the auxiliary throttle valve, and the second basic target slip value STB0 is adapted to control the brakes for the traction control. Then, the first target slip value STT for controlling the engine power is set by multiplying the first basic target slip value STT0 by a correction coefficient K1 (as shown in FIG. 6) in accordance with a vehicle speed indicated by the output signal Sv, a correction coefficient K2 (as shown in FIG. 7) in accordance with an accelerator position indicated by the output signal Sa, and a correction coefficient K3 (as shown in FIG. 8) in accordance with a steered angle indicated by the output signal Sd. Likewise, a second target slip value STB is set by multiplying the second basic target slip value STB0 by the correction coefficients K1, K2 and K3. Further, the first target slip value STT is set to be smaller than the second target slip value STB (STT<STB). In such a state that the slip value of the driven wheel as the reference slip value is set to be smaller than the predetermined threshold value, e.g. 0.5 km per hour, the final road surface friction coefficient $\mu F$ is set so as to increase in accordance with the time Tt during which the slip value continues to be smaller than the predetermined threshold value, as will be shown in Table 2 below.

The control unit 200 detects a wheel slip value SP of the driven wheel from the difference between the peripheral velocity VWD of the driven wheels and the average peripheral velocity VWN of the non-driven wheels on the basis of the peripheral velocities of the wheels 21L, 21R, 20L and 20R indicated by the output signals S1, S2, S3 and S4 entered thereinto. Further, a slip value SPL of the left-hand rear wheel 20L is computed from the difference between an average peripheral velocity of the front wheels obtainable by averaging out the peripheral velocities of the left-hand and right-hand front wheels 21L and 21R and a peripheral velocity VWDL of the left-hand rear wheel 20L. Likewise, a slip value SPR of the right-hand rear wheel 20R is computed from the difference between the average peripheral velocity of the front wheels obtainable by averaging out the peripheral velocities of the left-hand and right-hand front wheels 21L and 21R and a peripheral velocity VWDR of the right-hand rear wheel 20R.

When it is found as a result of comparison of the wheel slip value SP with the first target slip value STT that the state in which the wheel slip value SP becomes equal to or larger than the first target slip value STT is shifted from the state in which the wheel slip value SP is smaller than the first target slip value STT, the traction control is started by controlling the internal combustion engine 12 to reduce the engine power so as to cause the wheel slip value SP to become the first target slip value STT by controlling the throttle actuator 16 and adjusting the opening angle of the auxiliary throttle valve 17. Further, when it is found from comparison of the wheel slip value SPL from the second target slip value STB that the wheel slip value SPL of the left-hand rear wheel 20L is equal to or larger than the second target slip value STB, the traction control is performed by controlling the internal combustion engine to reduce the driving torque acting upon the left-hand rear wheel 20L by controlling the electromagnetic opening-closing valves 51 and 52 to operate the disk brake 35C, thereby making the peripheral velocity of the left-hand rear wheel 20L a target peripheral velocity corresponding to the second target slip value STB. In addition, when comparison of the wheel slip value SPR with the second target slip value STB reveals that the wheel slip value SPR of the right-hand rear wheel 20R is equal to or larger than the second target slip value STB, the traction control is implemented by controlling the brakes to reduce the driving torque acting upon the right-hand rear wheel 20R by controlling the electromagnetic opening-closing valves 53 and 54 to operate the disk brake 35D, thereby making the peripheral velocity of the right-hand rear wheel 20R a target peripheral velocity corresponding to the second target slip value STB.

In such a case, by making the wheel slip value SP of the driven wheel the first target slip value STT by adjusting the opening angle of the auxiliary-throttle valve 17, the first target slip value STT is set, for instance, so as to take up the state in which the driving force increased by depressing the accelerator pedal 14 can be transmitted from the left-hand rear wheel 20L and the right-hand rear wheel 20R to the road surface in an efficient way. Further, when no traction control is implemented by adjusting its opening angle, the auxiliary throttle valve 17 is maintained in such a state that it is opened to its maximum opening angle, i.e. in full open state.

The traction control by adjusting the opening angle of the auxiliary throttle valve 17 is implemented by supplying a driving signal Ct for adjusting the opening angle of the auxiliary throttle valve 17 to the throttle actuator 16 from the control unit 200 in order to make the wheel slip value SP of the driven wheel the first target slip value STT, when the state in which the wheel slip value SP is smaller than the first target slip value STT and the auxiliary throttle valve 17 is in full open state due to the implementation of no traction control is shifted, for instance, to the state in which the accelerator pedal 14 is depressed and the opening angle of the main throttle valve 15 is widened to increase acceleration, thereby allowing the wheel slip value SP to become equal to or larger than the first target slip value STT. In supplying the driving signal Ct from the control unit 200 to the throttle actuator 16, a control amount is set so as to decrease or increase the opening angle of the auxiliary throttle valve 17 or to retain the current opening angle thereof, and the driving signal Ct is formed in accordance with the control amount set. The opening angle of the auxiliary throttle valve 17 is then adjusted on the basis of the driving signal Ct supplied to the throttle valve 16, thereby controlling the engine power for implementing the traction control so as to take up the state in which the peripheral velocities of the driven wheels become approximately equal to target peripheral velocities corresponding to the first target slip value STT.

In setting the control amount for the throttle actuator 16, for instance, a peripheral acceleration of the driven wheel is determined on the basis of the peripheral velocity VWD of the driven wheel, and a difference from a target peripheral velocity of the peripheral velocity VWD of the driven wheel corresponding to the first target slip value STT is determined. Further, there is given a difference between the peripheral acceleration of the driven wheel and the target peripheral velocity of the peripheral velocity of the driven wheel. A control amount corresponding to the resulting difference is then determined by collating the difference with a data map, stored in a built-in memory, defining the relationship between those differences and the control amounts, and the control amount is set as a control amount for the throttle actuator 16.

In addition to the traction control by adjusting the opening angle of the auxiliary throttle valve 17, the traction control by controlling the brakes is implemented when the slip value SPL of the left-hand rear wheel 20L or the slip value SPR of the right-hand rear wheel 20R is equal to or larger than the second target slip value STB. More specifically, when the slip value SPL of the left-hand rear wheel 20L is equal to or larger than the second target slip value STB, the control unit 200 causes the electromagnetic opening-closing valves 51 and 52 to supply driving signals Ca and Cb, respectively, thereby operating the disk brake 35C so as to make the slip value SPL smaller than the second target slip value STB. Likewise, when the slip value SPR of the right-hand rear wheel 20R is equal to or larger than the second target slip value STB, the control unit 200 causes the electromagnetic opening-closing valves 53 and 54 to supply driving signals Cc and Cd, respectively, thereby operating the disk brake 35D so as to make the slip value SPR smaller than the second target slip value STB.

Figure 4:
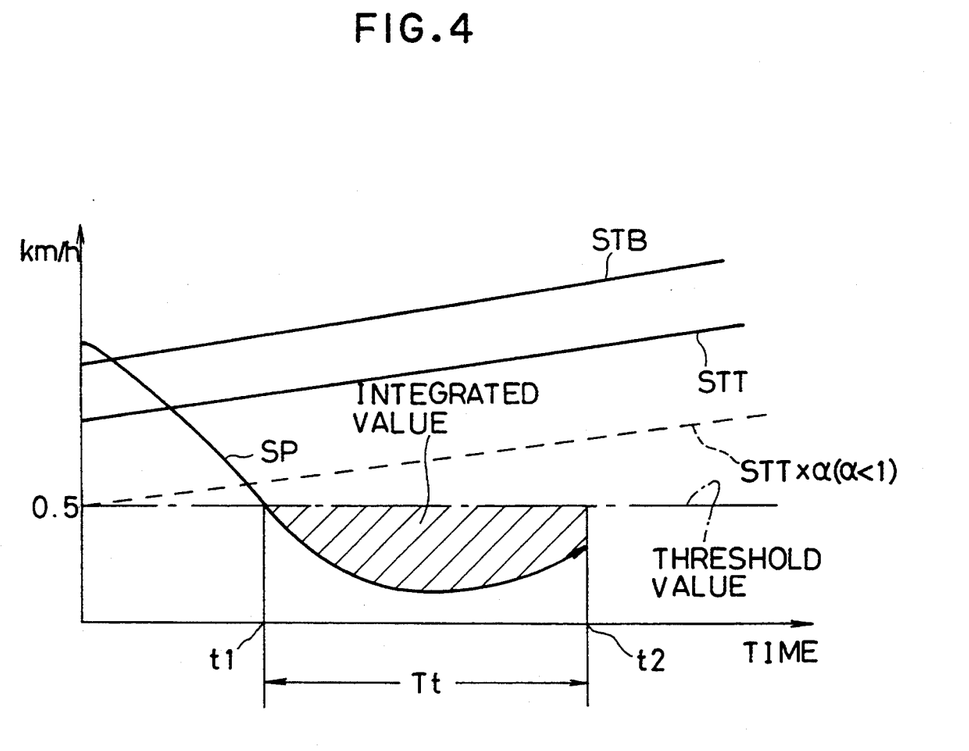
FIG. 4 is a graph showing the relationship of time relative to various values to be employed for the traction control.

When the traction control is implemented in the manner as described hereinabove and the wheel slip of the driven wheel is suppressed due to changes in states of road, the slip value SP of the driven wheel is set so as to increase, for instance, in accordance with the duration of time, Tt, during which the state continues in which the threshold value is smaller than, for example, 0.5 km per hour. The duration of time, Tt, is shown in FIG. 4. In accompany with the increase of the slip value SP of the driven wheel, the first and second target slip values STT and STB are varied, thereby releasing the operation for decreasing the driving torque to the left-hand and right-hand rear wheels 20L and 20R. As a consequence, the running state of the vehicle is quickly returned to the state in which the slip value of the driven wheel becomes the predetermined target slip value at which the increase of the driving force is efficiently transmitted to the road surface through the left-hand and right-hand rear wheels 20L and 2OR, thereby providing good feeling of acceleration when the accelerator pedal 14 is depressed with the intention to gain acceleration.

Figure 2:
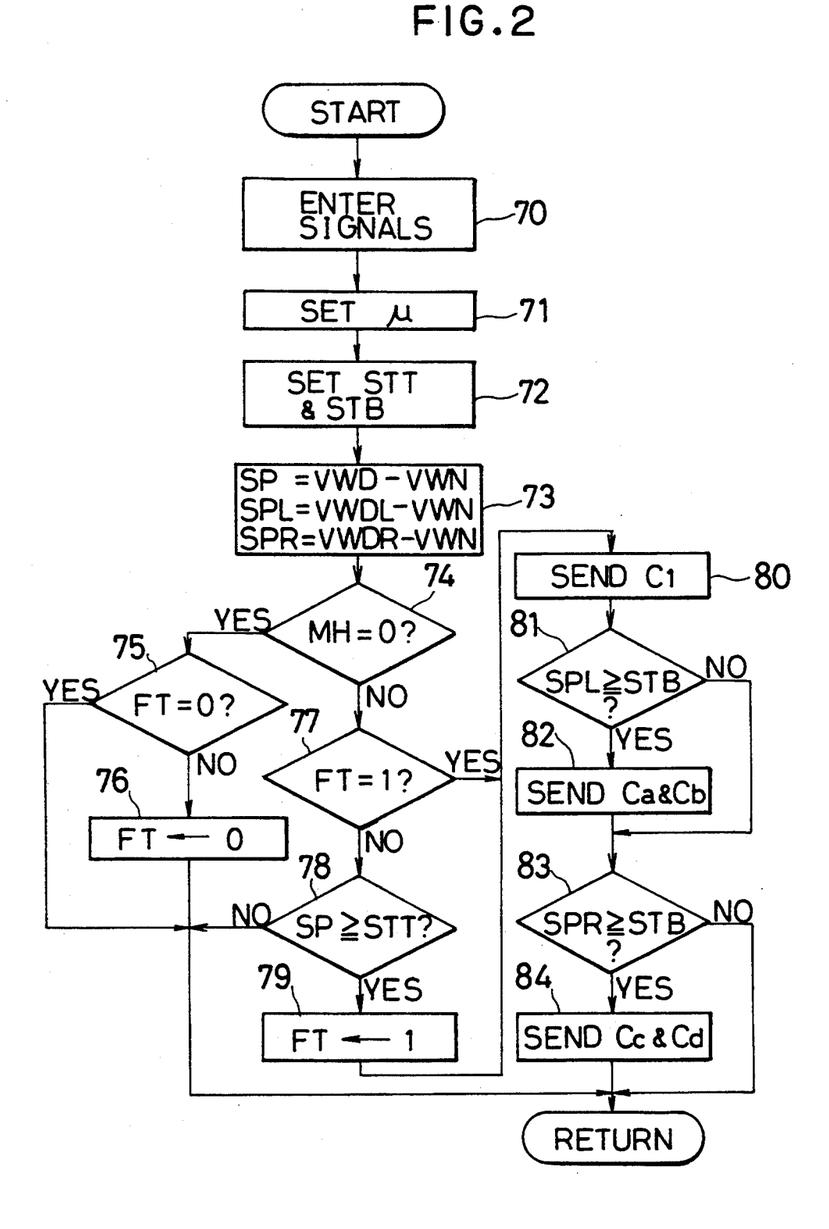
FIGS. 2 and 3 are flowcharts showing the traction control to be implemented by the traction control system according to the present invention.

A description will now be made of an example of executing a program for implementing the traction control with the aid of the control unit 200 composed of a microcomputer, with reference to a flowchart as shown in FIG. 2.

At step 70, the various signals are entered into the control unit 200 from the sensors, followed by proceeding to step 71 at which the road surface friction coefficient $\mu F$ is eventually set.

Then, at step 72, the first target slip value STT for traction control by adjusting the opening angle of the auxiliary throttle valve 17 and the second target slip value STB for traction control by controlling the brakes are set on the basis of the final road surface friction coefficient $\mu F$ set at step 71. The first target slip value STT is set by collating the final road surface friction coefficient $\mu F$ set at step 71 with the data map stored in the memory, as shown in FIG. 5, to give the first basic target slip value STT0 and then by multiplying the first basic target slip value STT0 by the correction coefficient K1 on the basis of the vehicle speed (FIG. 6), the correction coefficient K2 on the basis of the accelerator position (FIG. 7) and the correction coefficient K3 on the basis of the steered angle (FIG. 8). Likewise, the second target slip value STB is set by collating the final road surface friction coefficient $\mu F$ set at step 71 with the data map stored in the memory, as shown in FIG. 5, to give the second basic target slip value STB0 and then by multiplying the second basic target slip value STB0 by the correction coefficient K1 on the basis of the vehicle speed (FIG. 6), the correction coefficient K2 on the basis of the accelerator position (FIG. 7) and the correction coefficient K3 on the basis of the steered angle (FIG. 8). Further, the first target slip value STT is set to become smaller than the second target slip value STB.

Then, at step 73, the wheel slip value SP, the slip value SPL of the left-hand rear wheel 20L, and the slip value SPR of the right-hand rear wheel 20R are determined. More specifically, the slip value SP is calculated by selecting the higher peripheral velocity from the left peripheral velocity VWDL of the left-hand rear wheel 20L and the right peripheral velocity VWDR of the right-hand rear wheel 20R as the peripheral velocity VWD of the driven wheels, when the peripheral velocities of the driven wheels are different, and by subtracting the average peripheral velocity VWN of the non-driven wheels from the peripheral velocity VWD of the driven wheels, i.e. VWD−VWN. The left-hand rear wheel slip value SPL of the left-hand rear wheel 20L is computed from the difference obtainable by subtracting the average peripheral velocity VWN of the non-driven wheels from the left peripheral velocity VWDL of the left-hand rear wheel 20L, i.e. VWDL−VWN. Likewise, the right-hand rear wheel slip value SPR of the right-hand rear wheel 20R is computed from the difference obtainable by subtracting the average peripheral velocity VWN of the non-driven wheels from the right peripheral velocity VWDR of the right-hand rear wheel 20R, i.e. VWDR - VWN.

The program flow then goes to step 74 and a decision is made to determine if the opening angle MH of the main throttle valve 15 is "0", that is, if the main throttle valve 15 is in full closed state. When it is decided that the throttle valve 15 is in full closed state, then the program flow goes to step 75 at which a further decision is made to determine if a traction control flag FT is set to "0". When the result of decision at step 75 indicates that the traction control flag FT is not set to "0", on the one hand, then the traction control flag FT is set to "0" at step 76, followed by the return to step 70. When it is decided at step 75 that the traction control flag FT is set to "0", then the program flow returns directly to step 70.

When it is decided at step 74 that the main throttle valve 15 is held in full closed state, a decision is made at step 77 to determine if the traction control flag FT is set to "1". If the traction control flag FT is decided at step 77 to be not set to "1", a decision is made at step 78 to determine if the slip value SP of the driven wheel is equal to or larger than the first target slip value STT set at step 72. If it is decided at step 78 that the wheel slip value SP is smaller than the first target slip value STT, on the one hand, the program flow returns to step 70. When the result of decision at step 78 indicates that the wheel slip value SP is equal to or larger than the first target slip value STT, on the other hand, then the program flow goes to step 79 at which the traction control flag FT is set to "1", followed by proceeding to step 80.

At step 80, the driving signal Ct is sent from the control unit 200 to the throttle actuator 16 in order to adjust the slip value SP so as to agree with the first target slip value STT, thereby allowing traction control to be implemented by adjusting the opening angle of the auxiliary throttle valve 17 and proceeding to step 81. In sending the driving signal Ct to the throttle actuator 16 at step 80, first, the peripheral acceleration of the driven wheel is determined on the basis of the peripheral velocity of the driven wheel, and then the difference is determined from the target peripheral velocity of the driven wheel of the peripheral velocity of the driven wheel, corresponding to the first target slip value STT. Then, the resulting difference is collated with the pre-stored data map to determine the control amount corresponding to the difference. The driving signal Ct to be fed to the throttle actuator 16 is determined on the basis of the control amount, thereby increasing, decreasing or retaining the opening angle of the auxiliary throttle valve 17 in accordance with the control amount. The opening angle of the auxiliary throttle valve 17 is adjusted on the basis of the driving signal Ct supplied to the throttle actuator 16, and the engine power of the internal combustion engine 12 is controlled so as to cause the peripheral velocity of the driven wheel to agree substantially with the target peripheral velocity of the peripheral velocity of the driven wheel, corresponding to the first target slip value STT.

Then, at step 81, a decision is made to determine if the slip value SPL of the left-hand rear wheel 20L computed at step 73 is equal to or larger than the second target slip value STB set at step 72. When the result of decision at step 81 indicates that the slip value SPL is equal to or larger than the second target slip value STB, then the driving signals Ca and Cb are sent at step 82 to the electromagnetic opening-closing valves 51 and 52, respectively, in order to operate the disk brake 35C for implementing the traction control, followed by proceeding to step 83. If it is decided at step 81 that the slip value SPL is smaller than the second target slip value STB, then the program flow goes directly to step 83.

At step 83, it is decided to determine if the slip value SPR of the right-hand rear wheel 20R computed at step 73 is equal to or larger than the second target slip value STB computed at step 72. When the slip value SPR is decided at step 83 to be equal to or larger than the second target slip value STB, on the one hand, the driving signals Cc and Cd are sent to the electromagnetic opening-closing valves 53 and 54, respectively, thereby operating the disk brake 35D to implement the traction control, followed by the return to step 70. On the other hand, when it is decided at step 83 that the slip value SPR is smaller than the second target slip value STB, the program flow returns to step 70 as it is.

Figure 3:
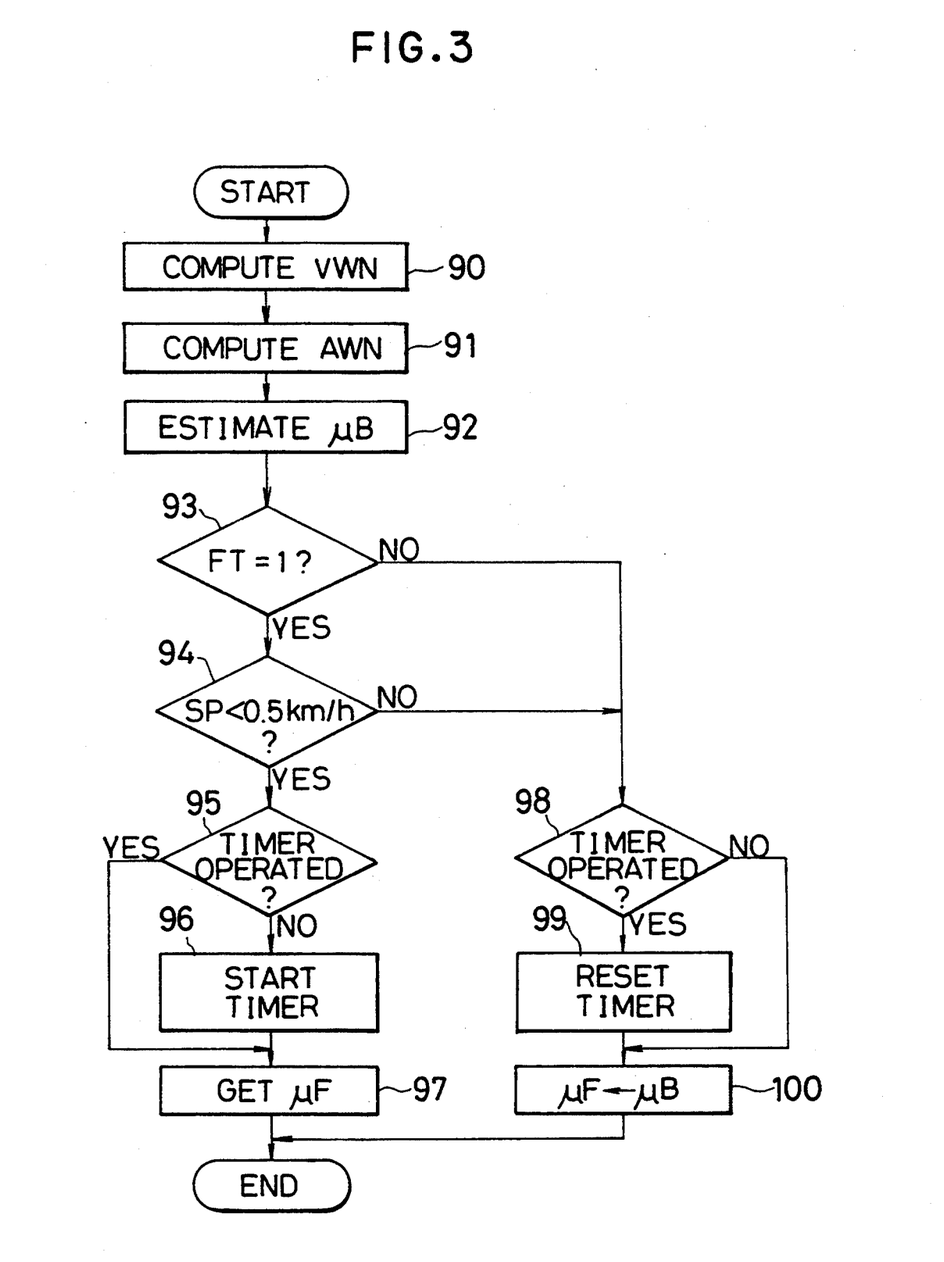

FIG. 3 illustrates the processing to be executed at step 71 of FIG. 2 for setting the friction coefficient $\mu$ of a road surface with which the driven wheels, i.e. left-hand and right-hand rear wheels 20L and 20R, are in touch.

First, at step 90, the average peripheral velocity VWN of the non-driven wheels is computed from the peripheral velocity of the left-hand front wheel 21L, VWNL, and the peripheral velocity of the right-hand front wheel 21R, VWNR. The resulting average peripheral velocity VWN is then differentiated to give the peripheral acceleration AWN of the uneven wheel, followed by proceeding to step 92.

At step 92, the average peripheral velocity VWN and the peripheral acceleration AWN of the non-driven wheels are collated with the data map stored in the memory built in the control unit 200 to determine an estimated basic road surface friction coefficient $\mu$B. The data map contains the relationship among the average peripheral velocities of the non-driven wheels, the peripheral acceleration of the non-driven wheels and the road surface friction coefficient $\mu$, as shown in Table 1 below.

TABLE 1

|  |  | 0 → LARGE PERIPHERAL ACCELERATION, AWN |  |  |  |  |  |
|---|---|---|---|---|---|---|---|
| 0 | AVERAGE | 1 | 2 | 3 | 4 | 5 | $\mu$B |
| ↓ | PERIPHERAL | 1 | 2 | 3 | 4 | 5 |  |
| ↓ | VELOCITY, | 1 | 2 | 3 | 5 | 5 |  |
| ↓ | AWN | 1 | 2 | 4 | 5 | 5 |  |
| LARGE |  | 1 | 3 | 4 | 5 | 5 |  |
|  |  | ROAD SURFACE FRICTION COEFFICIENT $\mu$B |  |  |  |  |  |

Then, at step 93, a decision is made to determine if the traction control flag FT is set to "1" and then, at step 94, a further decision is made to determine if the slip value SP is smaller than the difference obtained by subtracting the average peripheral velocity VWN of the non-driven wheels from the peripheral velocity VWD of the driven wheels, that is, if the wheel slip value SP is smaller than the predetermined threshold value, i.e. 0.5 km per hour, when the traction control flag is set to "1". When it is decided at step 94 that the slip value SP is smaller than 0.5 km per hour, then the program flow goes to step 95 and it is decided to determine if a timer built in the control unit 200 is operated. If the timer is not yet operated, on the one hand, the timer is turned on at step 96, followed by proceeding to step 97. When the timer has already been operated, on the other hand, the program flow goes directly to step 97.

At step 97, the duration of time, Tt, during which the slip value SP is continued to be smaller than the predetermined threshold value, is counted, and the basic road surface friction coefficient $\mu$B estimated at step 92 is corrected on the basis of the duration of time, Tt, with reference to the data map, as shown in Table 2 below, in order to give a correction value $\mu$A of the road surface friction coefficient for the corresponding duration of time Tt. The data map contains the relationship between the duration of time and correction values of road surface friction coefficient. The correction value $\mu$A is then added to the basic road surface friction coefficient $\mu$B, thereby giving the final road surface friction coefficient $\mu$F ($\mu$F=$\mu$B+$\mu$A).

TABLE 2

| DURATION OF TIME, Tt | CORRECTION VALUE $\mu$A OF ROAD SURFACE FRICTION COEFFICIENT |
|---|---|
| >1 SECOND | 0.01 |
| ≦1 SECONDS & >2 SECONDS | 0.05 |
| ≦2 SECONDS & >3 SECONDS | 0.10 |
| ≦3 SECONDS | 0.15 |

On the other hand, when it is decided at step 93 that the traction control flag FT is set to "0", or when it is decided at step 94 that the slip value SP is equal to or larger than 0.5 km per hour, then a decision is made at step 98 to determine if the timer built in the control unit 200 is operated. When the timer is decided to be operated, on the one hand, then the timer is reset, followed by proceeding to step 100. When it is decided at step 98 that the timer is not operated, on the other hand, the program flow goes directly to step 100. Then, at step 100, the basic road surface friction coefficient $\mu$B set at step 92 is set as it is as the final road surface friction coefficient $\mu$F without correction, followed by the end of the program.

Second Embodiment

Figure 9:
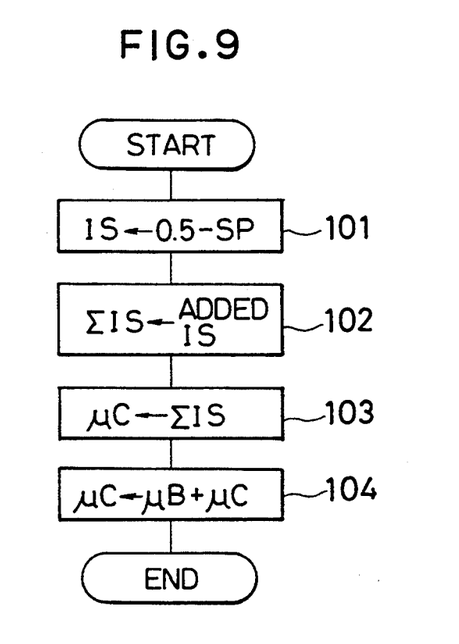
FIG. 9 is a flowchart showing a variant of the traction control according to the present invention.
Figure 10:
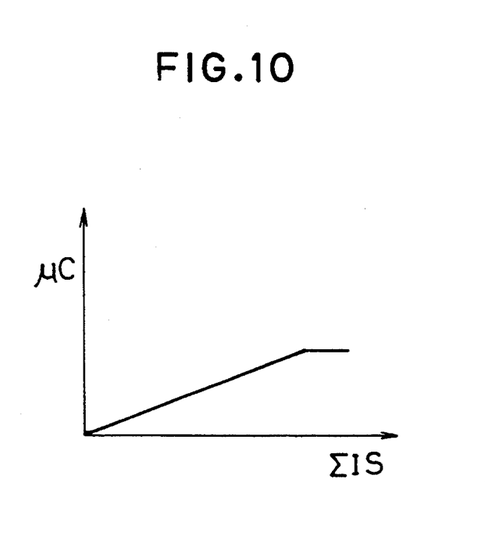
FIG. 10 is a graph showing the relationship between an integrated value and corrected road surface friction coefficient $\mu$, to be employed for the traction control in FIG. 9.

FIGS. 9 and 10 illustrate a second embodiment of the present invention. In this embodiment, the road surface friction coefficient $\mu$ is corrected on the basis of an integrated value of the duration of time, Tt, during which the slip value SP is smaller than the threshold value, e.g. 0.5 km per hour, as shown in FIG. 4. This integrated value is obtained by integrating values obtained by subtracting the wheel slip value SP from the threshold value of 0.5 for the duration of time Tt, and the road surface friction coefficient $\mu$ is corrected to a larger value as the integrated value becomes larger.

The contents of control will be described in detail with reference to the flowchart as shown in FIG. 9. First, at step 101, the difference IS is computed by subtracting the wheel slip value SP from the threshold of 0.5. Then, at step 102, the difference IS is added to the previous sum and the resulting sum is integrated to give a current integrated value ΣIS, followed by proceeding to step 103 at which the current integrated value ΣIS is then collated with a data map, thereby determining a corrected road surface friction coefficient μC. The data map contains data on integrated values ΣIS prepared and stored in advance in the control unit 200, as shown in FIG. 10. Then, at step 104, the corrected road surface friction coefficient μC is added to the basic road surface friction coefficient μB, thereby determining the final road surface friction coefficient μF. Then, the basic target slip values STT0 and STB0 are determined on the basis of the final road surface friction coefficient μF in substantially the same way as described in the first embodiment, thereby determining the target slip values STT and STB.

Third Embodiment

Figure 11:
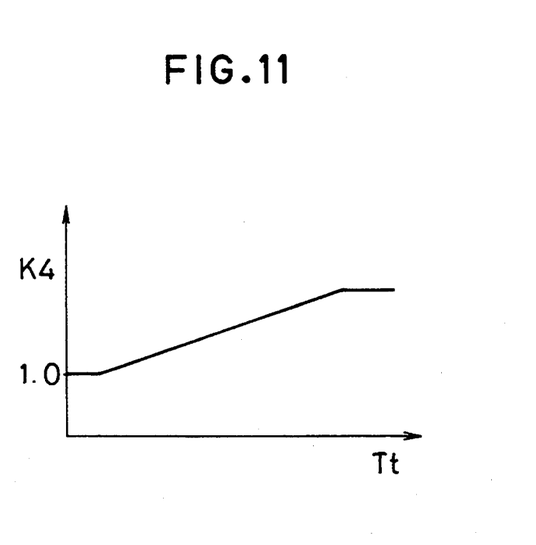
FIG. 11 is a graph showing an example of settings of correction coefficients to be employed when the target value is corrected directly.

FIG. 11 illustrates a correction coefficient K4 to be employed when the target value itself is corrected directly on the basis of the duration of time, Tt, as described above. The correction coefficient K4 may be multiplied by the basic target slip values STT0 and STB0 or by the target slip values STT and STB. Further, in this embodiment, the correction coefficient K4 may be set on the basis of the integrated value ΣIS, as described in connection with FIG. 9, in place of the duration of time, Tt.

It is to be noted herein that the slip value of the driven wheel may include a ratio of the peripheral velocity of the driven wheel to the peripheral velocity of the non-driven wheel or a ratio of the difference between the peripheral velocity of the driven wheel and the peripheral velocity of the non-driven wheel to the peripheral velocity of the non-driven wheel, in addition to the difference between the peripheral velocity of the driven wheel and the peripheral velocity of the non-driven wheel. Further, the threshold value (in this embodiment, 0.5 km per hour) for determining if the wheel slip of the driven wheel is in a converging state can be changed to a value corresponding to a setting of this slip value.

In addition, the threshold value may be set to be so variable as changing in accordance with the target slip value STT at an appropriate rate of the target slip value STT (STT×60 ; α<1) for controlling the engine power, for example, as shown in FIG. 4, in spite of such a constant value as being set to 0.5 km per hour. It can further be noted that the target slip value STB for controlling the brakes may be set smaller than the target slip value STT for controlling the engine, i.e. STB<STT. In this case, the threshold value may be set as a value smaller than the target slip value STB.

Further, the traction control may be arranged so as to implement either of the control of the engine power or the control of the brakes.

The wheel slip value SP for controlling the engine power may be based on the peripheral velocity of the left-hand or right-hand driven wheel, whichever smaller.

As the control amount to be corrected by the duration of time, Tt, or the integrated value ΣIS, there may be selected conveniently, for example, from a control gain for controlling the engine power and a control gain for controlling the brakes.

Although there is the traction control of such a type as being suspended when an actual slip value of a driven wheel has become a value smaller than a predetermined end value, the threshold value in this case may be set as a value larger than the end value.

The present invention has thus been shown and described with reference to specific examples, however, it should be noted that the invention is in no way limited to the details of the illustrated arrangements but changes and modifications may be made without departing from the scope and the spirit of the appended claims.

What is claimed is:

1. A traction control system for an automotive vehicle, comprising:
   torque adjustment means for adjusting torque to be applied to a driven wheel;
   slip detection means for detecting a slip value of the driven wheel relative to a surface of a road;
   torque control means for controlling said torque adjustment means so as to make a wheel slip value detected by said slip detection means become a predetermined target value;
   timer means for continuously counting a time during satisfaction of a predetermined condition that the wheel slip value detected by said slip detection means is smaller than a predetermined threshold value set as a value smaller than said predetermined target value, wherein said timer means initiates counting upon initial satisfaction of said predetermined condition, and said timer means is reset, when said predetermined condition is no longer satisfied; and
   correction means for correcting a control value to be employed for control by said torque control means so as to increase the torque to be applied to the driven wheel and for setting an amount of correction so as to become larger as the time counted by said timer means becomes longer.

2. A traction control system as claimed in claim 1, wherein said torque adjustment means contains at least engine adjustment means for adjusting torque to be generated by an internal combustion engine.

3. A traction control system as claimed in claim 1, wherein said torque adjustment means contains at least brake adjustment means for adjusting braking force to be applied to the driven wheel.

4. A traction control system as claimed in claim 1, wherein:
   said torque adjustment means contains; engine adjustment means for adjusting torque to be generated by an internal combustion engine and brake adjustment means for adjusting braking force to be applied to the driven wheel; and
   said torque control means contains engine control means for controlling said engine adjustment means and brake control means for controlling said brake adjustment means.

5. A traction control system as claimed in claim 4, wherein:
   said target value comprises two target values, one target value being for a target value for said engine control means and the other target value being for said brake control means; and
   said target value for said engine control means is different from said target value for said brake control means.

6. A traction control system as claimed in claim 5, wherein each of said target values is set in accordance with a road surface friction coefficient μ so as to become larger as the road surface friction coefficient $\mu$ becomes higher.

7. A traction control system as claimed in claim 6, wherein said correction means is adapted to correct the road surface friction coefficient $\mu$ so as to become higher as the time to be counted by said timer means becomes longer.

8. A traction control system as claimed in claim 6, wherein said road surface friction coefficient $\mu$ is set on the basis of a peripheral velocity of a non-driven wheel and peripheral acceleration of the non-driven wheel.

9. A traction control system as claimed in claim 5, wherein:
said target value for said engine control means is set as a value smaller than said target value for said brake control means; and
said threshold value is set as a value smaller than said target value for said engine control means.

10. A traction control system as claimed in claim 9, wherein:
said engine control means is adapted to implement control on the basis of either of a wheel slip value of a left-hand driven wheel or a wheel slip value of a right-hand driven wheel; and
said brake control means is adapted to control the left-hand driven wheel and the right-hand driven wheel independently and separately on the basis of each of the wheel slip values of the respective left-hand and right-hand driven wheels.

11. A traction control system as claimed in claim 10, wherein said slip detection means comprises:
first slip detection means for detecting a first slip value for controlling an internal combustion engine on the basis of either of the peripheral velocity of the left-hand driven wheel or the peripheral velocity of the right-hand driven wheel and a vehicle speed;
second slip detection means for detecting the wheel slip value of the left-hand driven wheel on the basis of the peripheral velocity of the left-hand driven wheel and the vehicle speed; and
third slip detection means for detecting the wheel slip value of the right-hand driven wheel on the basis of the peripheral velocity of the right-hand driven wheel and the vehicle speed.

12. A traction control system as claimed in claim 11, wherein said vehicle speed is computed as an average between the peripheral velocity of the right-hand driven wheel and the peripheral velocity of the left-hand driven wheel.

13. A traction control system as claimed in claim 11, wherein said first slip detection means is adapted to detect the wheel slip value on the basis of the peripheral velocity of the left-hand driven wheel or the right-hand driven wheel, whichever larger.

14. A traction control system as claimed in claim 13, wherein said timer means begins to count the time by comparing the wheel slip value detected by said first slip detection means with said threshold value.

15. A traction control system as claimed in claim 1, wherein said target value is set in accordance with a road surface friction coefficient $\mu$ so as to become larger as the road surface friction coefficient $\mu$ becomes higher.

16. A traction control system as claimed in claim 15, wherein said road surface friction coefficient $\mu$ is set on the basis of a peripheral velocity of a non-driven wheel and peripheral acceleration thereof.

17. A traction control system as claimed in claim 16, wherein:
said correction means is adapted to correct the road surface friction coefficient $\mu$ set on the basis of the peripheral velocity of the non-driven wheel and the peripheral acceleration thereof; and
said target value is set in accordance with the road surface friction coefficient $\mu$ corrected by said correction means.

18. A traction control system as claimed in claim 17, wherein said target value set in accordance with said road surface friction coefficient $\mu$ is further corrected on the basis of at least one of vehicle speed, accelerator position and steered angle of a steering wheel.

19. A traction control system as claimed in claim 1, wherein said correction means is adapted to correct a parameter for setting the target value so as to make said target value become larger as the time to be counted by said timer means becomes longer.

20. A traction control system as claimed in claim 1, wherein a condition of starting control by said torque control means is set at least as the time ,when the slip value to be detected by said slip detection means becomes equal to or larger than said target value.

21. A traction control system as claimed in claim 1, wherein a condition of finishing control by said torque control means is set at least as the time when an accelerator is full closed.

22. A traction control system as claimed in claim 1, wherein said slip value is set as a difference obtainable by subtracting a peripheral velocity of a driven wheel from a vehicle speed.

23. A traction control system as claimed in claim 1, wherein said threshold value is set as a predetermined constant value.

24. A traction control system as claimed in claim 1, wherein said threshold value is set as a predetermined rate of said target value.

25. A traction control system as claimed in claim 1, wherein said correction means is adapted to correct the target value itself.

26. A traction control system for an automotive vehicle, comprising:
torque adjustment means for adjusting torque to be applied to a driven wheel;
slip detection means for detecting a slip value of the driven wheel relative to a surface of road;
torque control means for controlling said torque adjustment means so as to make a wheel slip value detected by said slip detection means become a predetermined target value;
timer means for counting a time during control by said torque control means, said time being required to make the wheel slip value detected by said slip detection means smaller than a predetermined threshold value set as a value smaller than said predetermined target value;
correction means for correcting a control value to be employed for control by said slip control means so as to increase the torque to be applied to the driven wheel and for setting an amount of correction so as to become larger as the time counted by said timer means becomes larger; and
integration means for computing an integrated value of a difference obtained by subtracting the wheel slip value detected by said slip detection means from said threshold value for the time counted by said timer means;

wherein said correction means is adapted to make a correction amount for increasing torque applied to the driven wheel larger as the integrated value computed for the time becomes larger.

27. A traction control system for an automotive vehicle, comprising:
- torque adjustment means for adjusting torque to be applied to a driven wheel;
- slip detection means for detecting a slip value of the driven wheel relative to a surface of road;
- torque control means for controlling said torque adjustment means so as to make a wheel slip value detected by said slip detection means become a predetermined target value;
- timer means for counting a time during control by said torque control means, said time being required to make the wheel slip value detected by said slip detection means smaller than a predetermined threshold value set as a value smaller than said predetermined target value; and
- correction means for correcting said target value to be employed for control by said torque control means so as to increase the torque to be applied to the driven wheel and for setting an amount of correction so as to become larger as the time counted by said timer means becomes longer.

28. A traction control system for an automotive vehicle, comprising:
- torque adjustment means for adjusting torque to be applied to a driven wheel;
- slip detection means for detecting a slip value of the driven wheel relative to a surface of road;
- road surface friction estimating means for estimating a road surface friction coefficient;
- torque control means for controlling said torque adjustment means so as to make a wheel slip value detected by said slip detection means become a predetermined target value which is determined based on at least said road surface friction coefficient;
- timer means for counting a time during control by said torque control means, said time being required to make the wheel slip value detected by said slip detection means smaller than a predetermined threshold value set as a value smaller than said predetermined target value; and
- correction means for correcting said target value to be employed for control by said torque control means so as to increase the torque to be applied to the driven wheel and for setting an amount of correction so as to become larger as the time counted by said timer means becomes longer.

* * * * *